United States Patent
Horisaki et al.

(10) Patent No.: US 8,045,287 B1
(45) Date of Patent: *Oct. 25, 2011

(54) SELF-SERVO-WRITE METHOD WITH REPEATABLE RUNOUT COMPENSATION

(75) Inventors: Makoto Horisaki, Fujisawa (JP); Kiyotada Ito, Hiratsuka (JP)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,112

(22) Filed: Nov. 12, 2010

Related U.S. Application Data

(63) Continuation of application No. 12/330,181, filed on Dec. 8, 2008, now Pat. No. 7,835,107.

(60) Provisional application No. 61/016,140, filed on Dec. 21, 2007.

(51) Int. Cl.
*G11B 5/596* (2006.01)
(52) U.S. Cl. .................................. 360/77.04
(58) Field of Classification Search .............. None
See application file for complete search history.

(56) References Cited

U.S. PATENT DOCUMENTS

| | | | |
|---|---|---|---|
| 6,310,742 B1 | 10/2001 | Nazarian et al. | |
| 6,977,791 B2 | 12/2005 | Zhu et al. | |
| 7,119,981 B2 | 10/2006 | Hanson et al. | |
| 7,602,568 B1 | 10/2009 | Katchmart | |
| 7,835,107 B1 * | 11/2010 | Horisaki et al. | 360/77.04 |

OTHER PUBLICATIONS

"Interactive Learning Control and Repetitive Control in Hard Disk Drive Industry—A Tutorial"; Yang Quan Chen, Kevin L. Moore, Jie Yu and Tao Zhang; Sep. 17, 2006; 14 pages.

* cited by examiner

*Primary Examiner* — K. Wong

(57) ABSTRACT

A system including a self-servo-write, a position measuring module, and a compensation module. The self-servo-write module is configured to position a head of a hard disk drive to write a first set of servo wedges on a magnetic medium of the hard disk drive. The position measuring module is configured to measure a first position of the head when the head writes the first set of servo wedges on the magnetic medium. The compensation module is configured to generate first data to compensate a repeatable error based on the first position of the head measured by the position measuring module. The first data to compensate the repeatable error is written on the magnetic medium along with the first set of servo wedges.

20 Claims, 16 Drawing Sheets

SELF-SERVO-WRITE METHOD WITH REPEATABLE RUNOUT COMPENSATION

CROSS-REFERENCE TO RELATED APPLICATIONS

This application is a continuation of U.S. application Ser. No. 12/330,181 (now U.S. Pat. No. 7,835,107), filed on Dec. 8, 2008, which claims the benefit of U.S. Provisional Application No. 61/016,140, filed on Dec. 21, 2007. The disclosures of the applications referenced above are incorporated herein by reference.

FIELD

The present disclosure relates to hard disk drives (HDDs), and more particularly to compensating repeatable runout (RRO) errors during self-servo-write (SSW) operations of the HDDs.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (R/W) channel (hereinafter, "read-channel") module 28.

The HDD PCB 14 includes the read-channel module 28, a hard disk controller (HDC) module 30, a processor 32, a spindle/VCM driver module 34, volatile memory 36, non-volatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26.

During read operations, the read-channel module 28 receives analog signals from the preamplifier device 26. The read-channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo, which is stored on the platters 16, ensures that data is written to and read from correct locations on the platters 16. In some implementations, a self-servo write (SSW) module 42 may write servo on the platters 16 using the heads 20 prior to storing data on the HDD 10.

SUMMARY

In general, in one aspect, this specification describes a system that includes a self-servo-write module, a position measuring module, and a compensation module. The self-servo-write module is configured to provide a position at which a head of a hard disk drive is to write a first set of servo wedges on a magnetic medium of the hard disk drive. The position measuring module is configured to measure an actual position of the head when the head writes the first set of servo wedges on the magnetic medium. The compensation module is configured to generate data to compensate a repeatable error component based on the actual position of the head measured by the positioning measuring module. The data to compensate the repeatable error component is written on the magnetic medium along with the first set of servo wedges.

Systems and methods described herein may be implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
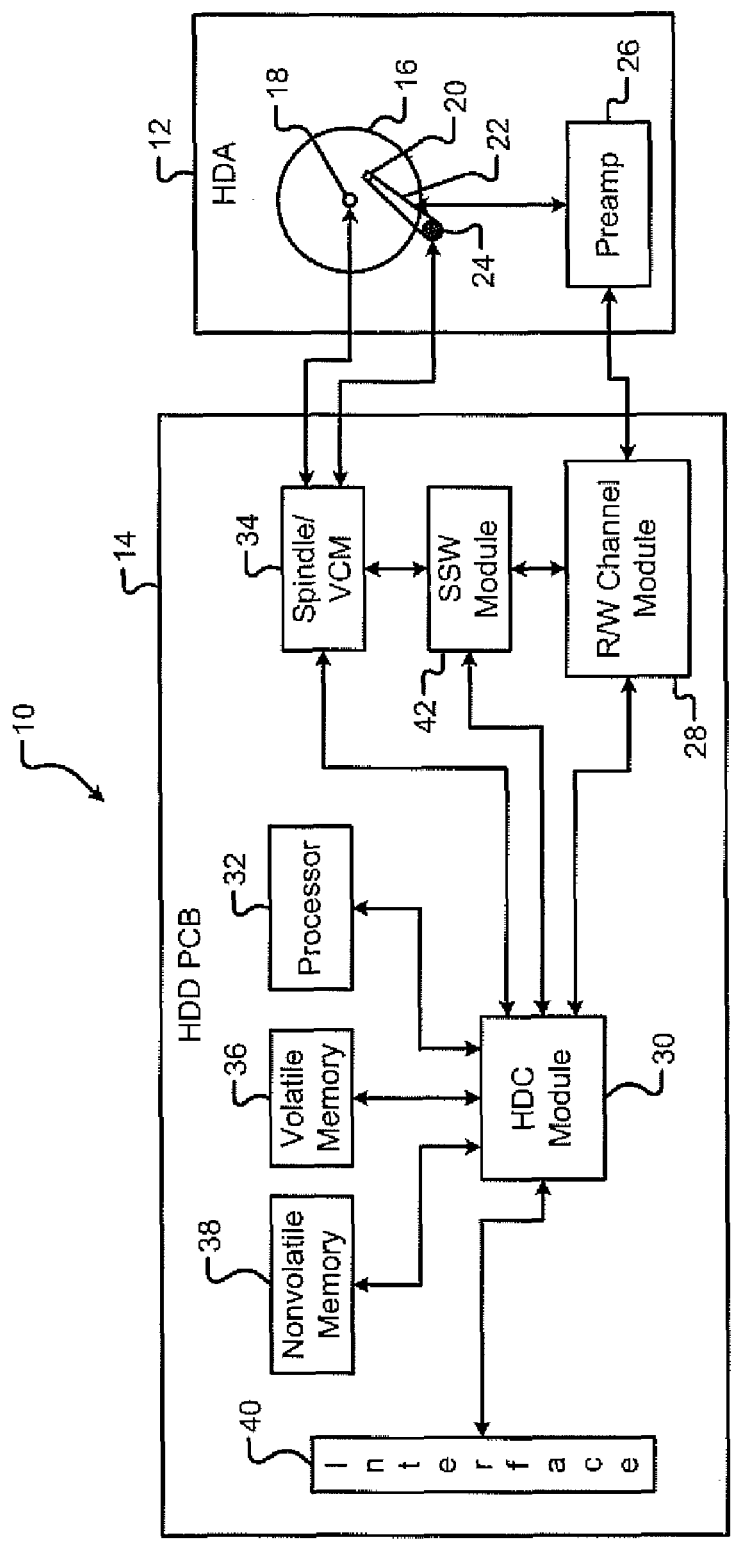
FIG. 1 is a functional block diagram of a hard disk drive (HDD)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Data is written on the platters 16 in concentric circular tracks. When a head writes/reads data to/from a track, the head is positioned at the center of the track using positioning information called servo information that is written at predetermined intervals on the track. The servo information may be written using a servo writer that is external to the hard disk drive (HDD). Alternatively, the servo information may be written using self-servo-write (SSW), where the heads 20 are used to write the servo information. Noise during servo writing may cause errors in the servo information written on the tracks. The head cannot be positioned at the center of the track when the servo information contains errors. Consequently, errors may occur during read/write operations.

The head may be positioned at the center of the track and the errors during read/write operations may be reduced by writing the servo information with least number of errors (i.e., with accuracy). The errors in writing servo information may include a component that repeats synchronously with the speed of the HDD. The component is called a repeatable runout (RRO) error. A repetitive error correction (REC) control is typically used to compensate the RRO errors. An example of the REC control is disclosed in "Iterative learning control and repetitive control in head disk drive industry—A tutorial," International Journal of Adaptive Control and Signal Processing, Volume 22, Issue 4, pp. 325-343.

Figure 2:
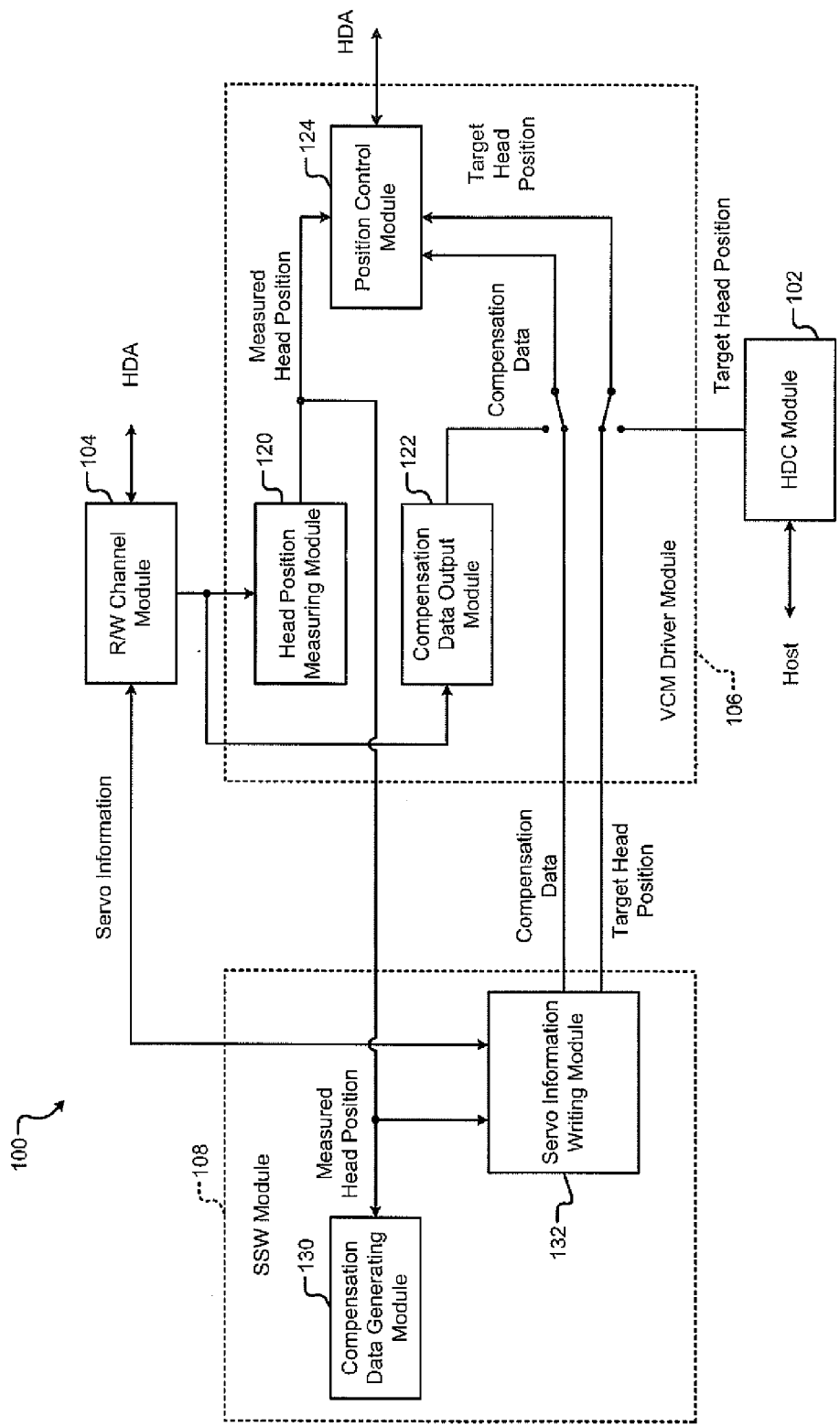
FIG. 2 is a functional block diagram of a system for compensating repeatable runout (RRO) errors when writing servo on the HDD.

Referring now to FIG. 2, a system 100 for compensating RRO errors when writing servo information using SSW is shown. The system 100 comprises a hard disk controller (HDC) module 102, a read/write channel module (hereinafter read-channel module) 104, a spindle/voice coil motor (VCM) driver module (hereinafter VCM driver module) 106, and a SSW module 108.

The HDC module 102 controls the operation of the HDD according to control instructions received from a host (not shown). For example, the HDC module 102 may receive from the host an address of a track to be accessed during a read/write operation. Based on the address of the track, the HDC module 102 generates a target head position. The HDC module 102 outputs the target head position to the VCM driver module 106. The VCM driver module 106 moves the head to the target position in a radial direction. The read-channel module 104 outputs data to be written on the track to the HDA (not shown) during a write operation. The read-channel module 104 receives from the HDA data read from the track during a read operation.

During SSW operation, the VCM driver module 106 receives position control information from the SSW module 108. The VCM driver module 106 moves the head in the radial direction according to the position control information. The VCM driver module 106 comprises a head position measuring module 120, a compensation data output module 122, and a position control module 124. The head position measuring module 120 measures a current head position. The head position measuring module 120 may measure the current head position based on the address of the track and the servo information read by the head. The compensation data output module 122 outputs compensation data that is used to compensate the position control data generated by the position control module 124.

During SSW operation, the compensation data is generated by the SSW module 108 based on a measured head position. The measured head position is generated while writing the servo information. For example, the measured head position is generated while writing a first set of servo wedges based on servo spirals that are written before writing the first set of servo wedges. The compensation data is generated based on the measured head position and is written in a RRO region.

Subsequently, when writing a second set of servo wedges, the head position is measured based on the first set of servo wedges. The position control data is compensated using the compensation data read from the RRO region of the track to be accessed. New compensation data is generated based on the measured head position while writing the second set of servo wedges. The new compensation data is written in the RRO region when writing the second set of servo wedges. The new compensation data may also be used to update the compensation data already written when writing the first set of servo wedges. The compensation data compensates the RRO error component of the position control information. The compensation data may eliminate the RRO error component from the measured head position.

The position control module 124 receives the target head position and the measured head position. The position control module 124 generates the position control data based on a difference between the target head position and the measured head position. The position control module 124 may filter the difference so that the measured head position may approach the target head position. Accordingly, the position control module 124 can move the head onto the track to be accessed.

The position control module 124 also receives the compensation data. When accessing the track to be accessed, the position control module 124 compensates the position control data using the compensation data. For example, the position control module 124 may compensate the position control data by adding the compensation data to the measured head position.

The position control module 124 may also compensate the position control data by adding the compensation data to the difference between the measured head position and the target head position. Thus, the position control module 124 may eliminate the RRO error component from the position control data.

The VCM driver module 106 communicates with the SSW module 108 when writing servo information. The VCM driver module 106 receives from the SSW module 108 the servo information to be written, a control instruction indicating operational details of writing the servo information, and a target head position where the servo information is to be written. When writing the servo information, the VCM driver module 106 also receives from the SSW module 108 the compensation data for compensating the position control data. When writing the servo information, the VCM driver module 106 outputs to the SSW module 108 the measured head position generated by the head position measuring module 120.

The VCM driver module 106 writes the servo information received from the SSW module 108 to the servo region on the track designated by the control instruction and the target head position. Additionally, the VCM driver module 106 may write the compensation data received from the SSW module 108 to the servo region (e.g., a RRO region).

The SSW module 108 controls the VCM driver module 106 when writing the servo information. The SSW module 108 also generates the compensation data for compensating the position control data. The SSW module 108 comprises a compensation data generating module 130 and a servo information writing module 132. The compensation data generating module 130 receives from the VCM driver module 106 the measured head position when writing the servo information. The compensation data generating module 130 may receive the measured head position from the head position measuring module 120.

The compensation data generating module 130 generates the compensation data based on the measured head position. The compensation data generating module 130 generates the compensation data for compensating the RRO error component synchronized with the speed of the HDD. The compensation data may eliminate the RRO error component from the position control data. The servo information writing module 132 outputs the compensation data to the VCM driver module 106. The VCM driver module 106 writes the compensation data to the servo region (e.g., the RRO region).

The servo information writing module 132 outputs the servo information to be written to the read-channel module 104. The servo information writing module 132 outputs a control instruction and a target head position to the VCM driver module 106. The VCM driver module 106 moves the head to the radial position to which the servo information is to be written. The read-channel module 104 writes the servo information.

The servo information writing module 132 may use the servo information already written on the track to write new servo information to a portion of the other sectors on the track or to a portion of the sectors where the servo information is already written. The servo information writing module 132 may compensate the position control data using the compensation data generated based on the head position measured while writing the prior servo information.

The servo information writing module 132 may execute the repetitive error correction (REC) control to write the new servo information. The servo information writing module 132 may output to the VCM driver module 106, as an initial value for the REC control, the compensation data generated based on the head position measured while writing the prior servo information.

More specifically, the compensation data generating module 130 generates an estimated actual head position based on the head position measured while writing the servo information. The compensation data generating module 130 generates the estimated actual head position by multiplying the measured head position by an estimation filter for estimating the actual head position.

The compensation data generating module 130 generates the estimated actual head position by performing an operation expressed by Equation (1):

$$apos\hat{} = G * dpos \quad (1)$$

where "apos^" denotes the estimated actual head position while writing the servo information, dpos denotes the measured head position, and G denotes a transfer function of the estimation filter.

The estimation filter G has a transfer function represented by Equation (2):

$$G = (K_{re} - T)/S = K_{re} + [(1 - K_{re}) * (-L)] \quad (2)$$

where S denotes a characteristic of compressing a positional disturbance of a servo loop for controlling the head position, T denotes a closed loop characteristic of the servo loop, and L denotes an open loop characteristic of the servo loop.

In addition, $K_{re}$ is defined by Equation (3):

$$K_{re} = \beta/(\alpha + \beta) \quad (3)$$

where $\alpha$ is represented by Equation (4), and $\beta$ is represented by Equation (5):

$$\alpha = (\sigma_{dR})^2 + (\sigma_{noiseR})^2 + (\sigma_{cmpR})^2 + (\sigma_{noiseN})^2 \quad (4)$$

$$\beta = (\sigma_{dN})^2 + |P|^2 * (\sigma_{fR})^2 + |P|^2 * (\sigma_{fN})^2 \quad (5)$$

In Equation (4), $(\sigma_{dR})^2$ denotes a variance of a cyclic head position error synchronized with the speed of the HDD. Among the noise components added to the measured head position, $(\sigma_{noiseR})^2$ denotes a variance of a cyclic component synchronized with the speed. $(\sigma_{noiseN})^2$ denotes a variance of a non-cyclic component not synchronized with the speed. $(\sigma_{cmpR})^2$ denotes a variance of the compensation data for compensating the position control data for controlling the head position.

In Equation (5), P denotes a transfer function of the head, the actuator arm 22, and the VCM 24 (collectively, the head moving mechanism). $(\sigma_{dN})^2$ denotes a variance of a non-cyclic head position physical error not synchronized with the speed. Among the disturbances of a force or a torque applied to the head moving mechanism, $(\sigma_{fR})^2$ denotes a variance of a cyclic component synchronized with the speed. $(\sigma_{fN})^2$ denotes a variance of a non-cyclic component not synchronized with the speed.

The characteristics of the servo loop in Equation (2), the transfer function P of Equation 5, and the variance of each error component in Equations (4) and (5) can be generated in advance during manufacturing. The VCM driver module 106 may measure the variance of each transfer function and each error component in Equations (4) and (5).

The compensation data generating module 130 outputs the actual head position estimated while writing the servo information as the compensation data for compensating the position control data. The compensation data generating module 130 outputs the compensation data as shown in Equation (6):

$$cmpR = apos\hat{}\quad(6)$$

where cmpR denotes the compensation data, and "apos^" denotes the estimated actual head position while writing the servo information. Thus, the compensation data generating module 130 generates the compensation data for compensating the RRO error component based on the measured head position while writing the servo information.

Figure 3:
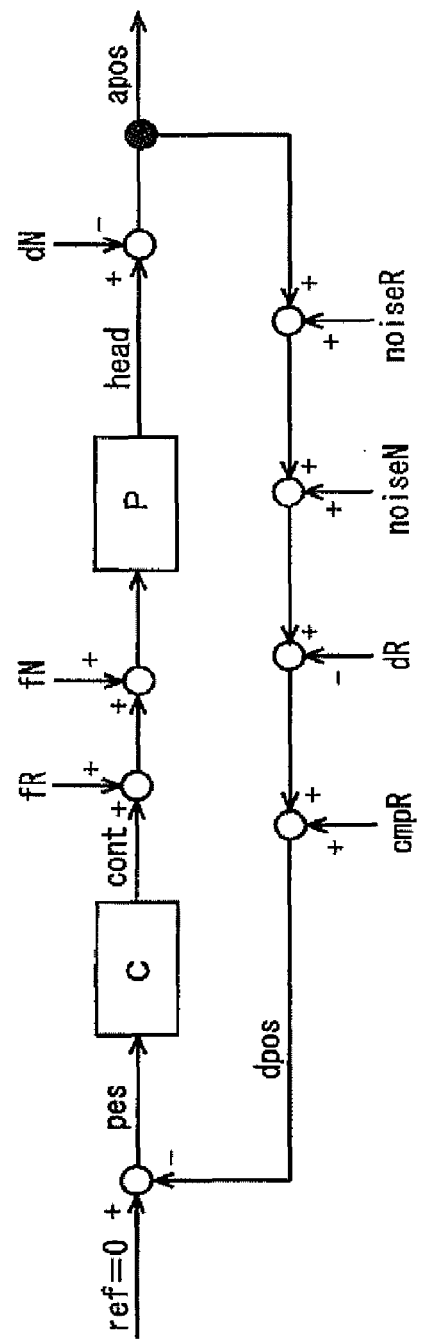
FIG. 3 is a schematic of a servo loop for controlling position of a read/write head when writing servo on the HDD.

Referring now to FIG. 3, a representative model of the servo loop for controlling the head position is shown. The servo loop generates the position control data "cont" obtained by multiplying a difference "pes" (i.e., position error signal) by a transfer function C of the components of the position control module 124. The difference "pes" is obtained by subtracting the measured head position "dpos" from the target head position "ref." The servo loop outputs the generated position control data "cont" to the head moving mechanism represented by a transfer function "P." Thus, the servo loop moves the head to the head position "apos."

The symbols in the model of the servo loop in FIG. 3 are as follows. "apos" denotes a relative head position, i.e., actual head position, of the head in the radial direction. "dpos" denotes a detected head position (i.e., the measured head position) in the radial direction. "ref" denotes the target head position supplied by the host, for example. "pes" denotes the difference between the measured head position and the target head position. "cont" denotes the position control data output by the position control module 124. "head" denotes a physical position of the head.

Among the errors added to the position control data "cont," "fR" denotes an error component synchronized with the speed of the HDD (i.e., a cyclical control error). "fN" denotes an error component not synchronized with the speed (i.e., a non-cyclic control error). "dN" denotes a physical error not synchronized with the speed (i.e., a non-cyclic head position error), which is added to the actual head position "apos."

Among the noise components added to the measured head position "dpos," "noiseR" denotes a noise component synchronized with the speed (i.e., a cyclic noise). "noiseN" denotes a noise component not synchronized with the speed (i.e., a non-cyclic noise). "dR" denotes an error component synchronized with the speed (i.e., a cyclic head position error). "cmpR" denotes the compensation data for canceling the cyclic head position error (dR).

"C" denotes the transfer function of the components of the position control module 124 that outputs the position control data "cont" according to the difference "pes." "P" denotes the transfer function of the head moving mechanism for moving the head according to the control data "cont".

The transfer functions "S," "T," "L," and "D" in the model of the servo loop of FIG. 3 are derived as shown in Equations (11)-(14).

$$S = 1/(1+C*P) \quad (11)$$

$$T = C*P/(1+C*P) \quad (12)$$

$$L = C*P \quad (13)$$

$$D = P/(1+C*P) \quad (14)$$

"S" denotes the characteristic of compressing the positional disturbance of the servo loop. "T" denotes the closed loop characteristic of the servo loop. "L" denotes the open loop characteristic of the servo loop. "D" denotes the characteristic of compressing the force disturbance, i.e., "fR" and "fN" of the loop.

In the model of FIG. 3, when the target head position "ref" is set to 0, the actual head position "apos" is represented by Equation (21), and the measured head position "dpos" is represented by Equation (22):

$$apos = +T*(dR - \text{noise}R - cmpR) - S*dN - T*\text{noise}N + D*(fR + fN) \quad (21)$$

$$dpos = +S*(dR - \text{noise}R - cmpR) - S*dN - S*\text{noise}N + D*(fR + fN) \quad (22)$$

The estimated data "apos^" estimating the actual head position is defined as in Equation (23) below. The estimated data "apos^" is generated by multiplying the measured head position "dpos" by the estimation filter G estimating the actual head position.

$$apos\hat{} = G*dpos \quad (23)$$

After substituting Equation (22) into the Equation (23), the estimated data "apos^" is expressed by Equation (24):

$$apos\hat{} = -G*S*(dR - \text{noise}R - cmpR) - G*S*dN \quad (24)$$
$$+ G*S*\text{noise}N + G*D*(fR + fN)$$

The estimation performed by the estimation filter G for estimating the actual head position is optimum when the value of Equation (25) is minimum, i.e., nearest to 0. The estimation performed by the estimation filter G is optimum when a difference between the actual head position generated by Equation (21) and the estimated head position generated by Equation (24) is minimum.

Equation (24) is obtained by multiplying the measured head position generated according to Equation (22) by the estimation filter G. Thus, $$apos - apos\hat{} = apos - G*dpos \quad (25)$$

The estimation filter G is calculated when "apos apos^" in Equation (25) is minimum.

By substituting Equations (21) and (24) into the right-hand side of Equation (25), Equation (25) is changed into Equation (26):

$$apos - apos\hat{} = (T + G*S)*(dR - \text{noise}R - cmpR) - (S - G*S)* \quad (26)$$
$$dN - (T + G*S)*\text{noise}N + (D - G*D)*(fR + fN)$$
$$= (T + G*S)*(dR - \text{noise}R - cmpR) - (1 - G)*$$
$$S*dN - (T + G*S)*\text{noise}N + (1 - G)*D*$$
$$(fR + fN)$$

"K" is defined as follows in Equation (27):

$$K = T + G*S \quad (27)$$

Equation (27) is broken down into Equations (28)-(31) as follows:

$$G = (K - T)/S \quad (28)$$

$$(1 - G) = (S + T - K)/S = (1 - K)/S \quad (29)$$

$$(1 - G)*S = (1 - K) \quad (30)$$

$$(1 - G)*D = (1 - G)*P*S = (1 - K)*P \quad (31)$$

By substituting Equations (27)-(31) into the right-hand side of Equation (26), Equation (26) is changed into Equation (32):

$$apos - apos\hat{} = K*(dR - noiseR - cmpR) - (1-K)*dN - K* \quad (32)$$
$$noiseN + (1-K)*P*(fR+fN)$$

When the variance of X is expressed by $(\sigma_X)^2$, the variance of "apos-apos^" $(\sigma_{apos-apos\hat{}})^2$ is expressed by Equation (33):

$$(\sigma_{apos-apos\hat{}})^2 = |K|^2 * (\sigma_{dR-noiseR-cmpR})^2 + |1-K|^2 * \quad (33)$$
$$(\sigma_{dN})^2 + |K|^2 * (\sigma_{noiseN})^2 + |1-K|^2 *$$
$$|P|^2 * (\sigma_{fR+fN})^2$$
$$= |K|^2 * [(\sigma_{dR})^2 + (\sigma_{noiseR})^2 + (\sigma_{cmpR})^2] +$$
$$|1-K|^2 * (\sigma_{dN})^2 + |K|^2 * (\sigma_{noiseN})^2 +$$
$$|1-K|^2 * |P|^2 * [(\sigma_{fR})^2 + (\sigma_{fN})^2]$$
$$= |K|^2 * [(\sigma_{dR})^2 + (\sigma_{noiseR})^2 + (\sigma_{cmpR})^2 +$$
$$(\sigma_{noiseN})^2] + |1-K|^2 * [(\sigma_{dN})^2 + |P|^2 *$$
$$(\sigma_{fR})^2 + |P|^2 * (\sigma_{fN})^2]$$

$\alpha$ and $\beta$ are defined by Equation (34) and Equation (35), respectively:

$$\alpha = (\sigma_{dR})^2 + (\sigma_{noiseR})^2 + (\sigma_{cmpR})^2 + (\sigma_{noiseN})^2 \quad (34)$$
$$\beta = (\sigma_{dN})^2 + |P|^2 * (\sigma_{fR})^2 + |P|^2 * (\sigma_{fN})^2 \quad (35)$$

By substituting Equations (34) and (35) into the right-hand side of Equation (33), Equation (33) is changed into Equation (36):

$$(\sigma_{apos-apos\hat{}})^2 = \alpha * |K|^2 + \beta * |1-K|^2 \quad (36)$$

With the real component of K is represented by $K_{re}$, and the imaginary component of K is represented by $K_{im}$, K is expressed as:

$$K = K_{re} + jK_{im} \quad (37)$$

By substituting Equation (37) into the right-hand side of Equation (36), Equation (36) is changed into Equation (38):

$$(\sigma_{apos-apos\hat{}})^2 = \alpha * |K|^2 + \beta * |1-K|^2 \quad (38)$$
$$= \alpha * |K_{re} + jK_{im}|^2 + \beta * |1 - (K_{re} + jK_{im})|^2$$
$$= \alpha * (K_{re}^2 + K_{im}^2) + \beta * \lfloor (1 - K_{re})^2 + K_{im}^2 \rfloor$$
$$= \alpha * (K_{re}^2 + K_{im}^2) + \beta * \lfloor 1 - 2K_{re} + K_{re}^2 + K_{im}^2 \rfloor$$
$$= (\alpha + \beta) * K_{re}^2 - 2\beta * K_{re} + (\alpha + \beta) * K_{im}^2 + \beta$$
$$= (\alpha + \beta) * \left( K_{re} - \frac{\beta}{\alpha + \beta} \right)^2 + (\alpha + \beta) * K_{im}^2 +$$
$$\frac{\alpha\beta}{\alpha + \beta}$$

Equation (38) is minimum when. Equations (39) and (40) are satisfied. When Equations (39) and (40) are satisfied, Equation (38) takes a value represented by Equation (41):

$$K_{re} = \frac{\beta}{\alpha + \beta} \quad (39)$$

$$\text{min. of } (\sigma_{apos-apos\hat{}})^2 = \frac{\alpha\beta}{\alpha+\beta} \quad (41)$$

When $(\sigma_{apos-apos\hat{}})^2$ is minimum, i.e., when $(\sigma_{apos-apos\hat{}})^2$ is nearest to 0, "apos-apos^" will be minimum. Therefore, the estimation filter G that will result in the minimum value of "apos-apos^" in Equation (25), i.e., the optimum estimation filter G, is given by a transfer function of Equation (42). Note that $K_{re}$ in Equation (42) is given by Equation (43):

$$G = (K_{re} - T)/S = K_{re} + (1 - K_{re})*(-L) \quad (42)$$

$$K_{re} = \frac{\beta}{\alpha + \beta} \quad (43)$$

As explained above, the compensation data generating module 130 may generate the estimation filter G that minimizes the difference between the actual head position (i.e., Equation (21)) and the estimated head position (i.e., Equation (24)) obtained by multiplying the measured head position (i.e., Equation (22)) by the estimation filter G. The compensation data generating module 130 may generate the estimation filter G that minimizes the variance (i.e., Equation (33)) of the difference between the actual head position and the estimated head position.

The compensation data generating module 130 may generate the estimation filter G based on at least one of the following: cyclic and non-cyclic head position error, cyclic and non-cyclic head position measurement error, respective variances of cyclic and non-cyclic head position control error, and a transfer function of the head moving mechanism.

Thus, the compensation data generating module 130 may generate the optimum estimation filter that can estimate the head position nearest to the actual head position. Consequently, the compensation data generating module 130 may generate compensation data that can compensate the position control data accurately.

Figure 4:
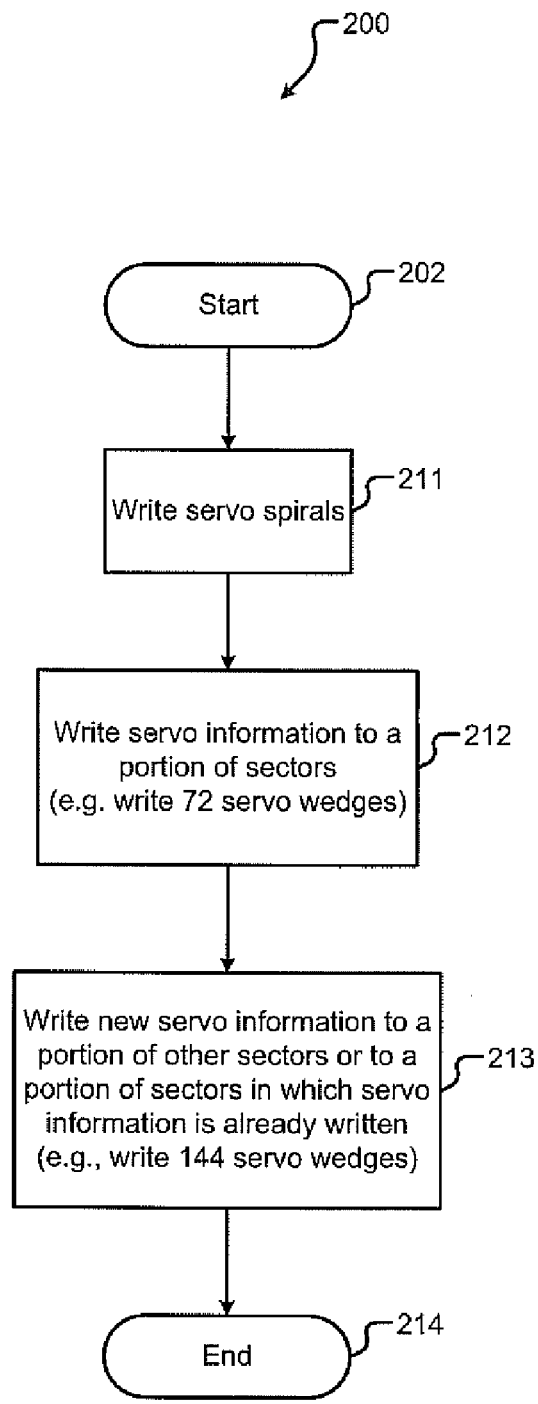
FIG. 4 is a flowchart of a method for writing servo on the HDD.

Referring now to FIG. 4, a method 200 for writing servo information begins in step 202. Control writes provisional servo information (i.e., servo spirals) in step 211. In step 212, control writes servo information (i.e., the first set of servo wedges) to a portion of the sectors on the disk based on the provisional servo information. For example, control may write servo information to half the sectors. In step 213, based on the servo information written in step 212, control writes new servo information (i.e., the second set of servo wedges) to a portion of the other sectors or to the portion of the sectors to which the servo information has already been written in step 212.

For example, control may write new servo information to a portion of the other sectors excluding the sectors to which servo information has already been written. Alternatively, control may write new servo information to the sectors or a portion of the sectors to which servo information has been written. Otherwise, control may write new servo information to a portion of the sectors or to each of the sectors to which servo information has not been written. In some implementations, control may write new servo information to each sector. For example only, control may write new servo information to each sector using half the sectors to which servo information has been written.

In steps 212 and 213, control may also write servo information to a portion of the sectors (e.g., ⅓ or ¼ of all the sectors). Control repeats step 213 based on the already written servo information until servo information is written to each sector. Control ends in step 214 when servo information is written to each sector.

Figure 5:
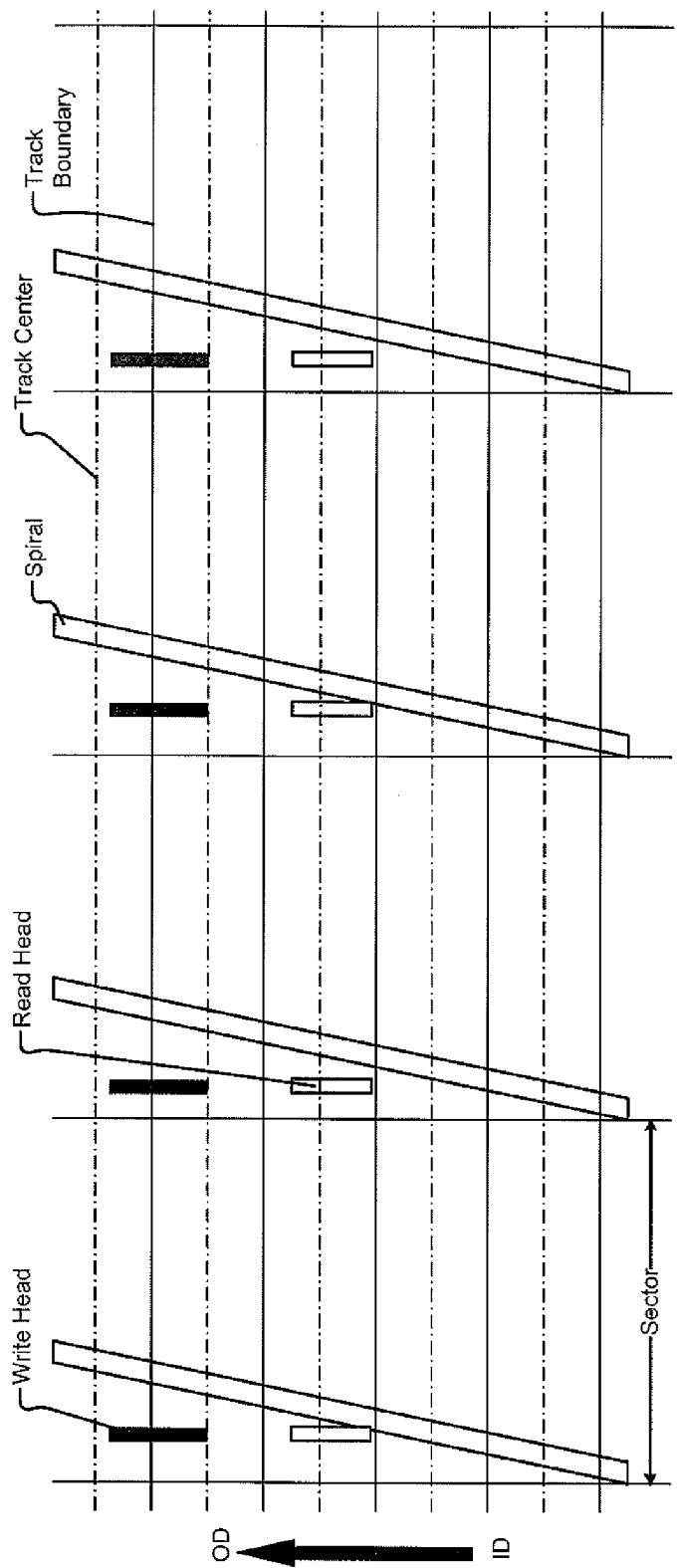
FIG. 5 is a schematic showing servo spirals written on the HDD.

Referring now to FIG. 5, an example of the provisional servo information is shown. For example, in step 211 of FIG. 4, control may write a servo spiral to each sector on the disk as provisional servo information. The servo spiral may be substantially linear and may traverse a plurality of tracks. The servo spiral may be written at a predetermined angle relative to the radial direction. The head position is controlled by detecting the servo spiral.

Figure 6:
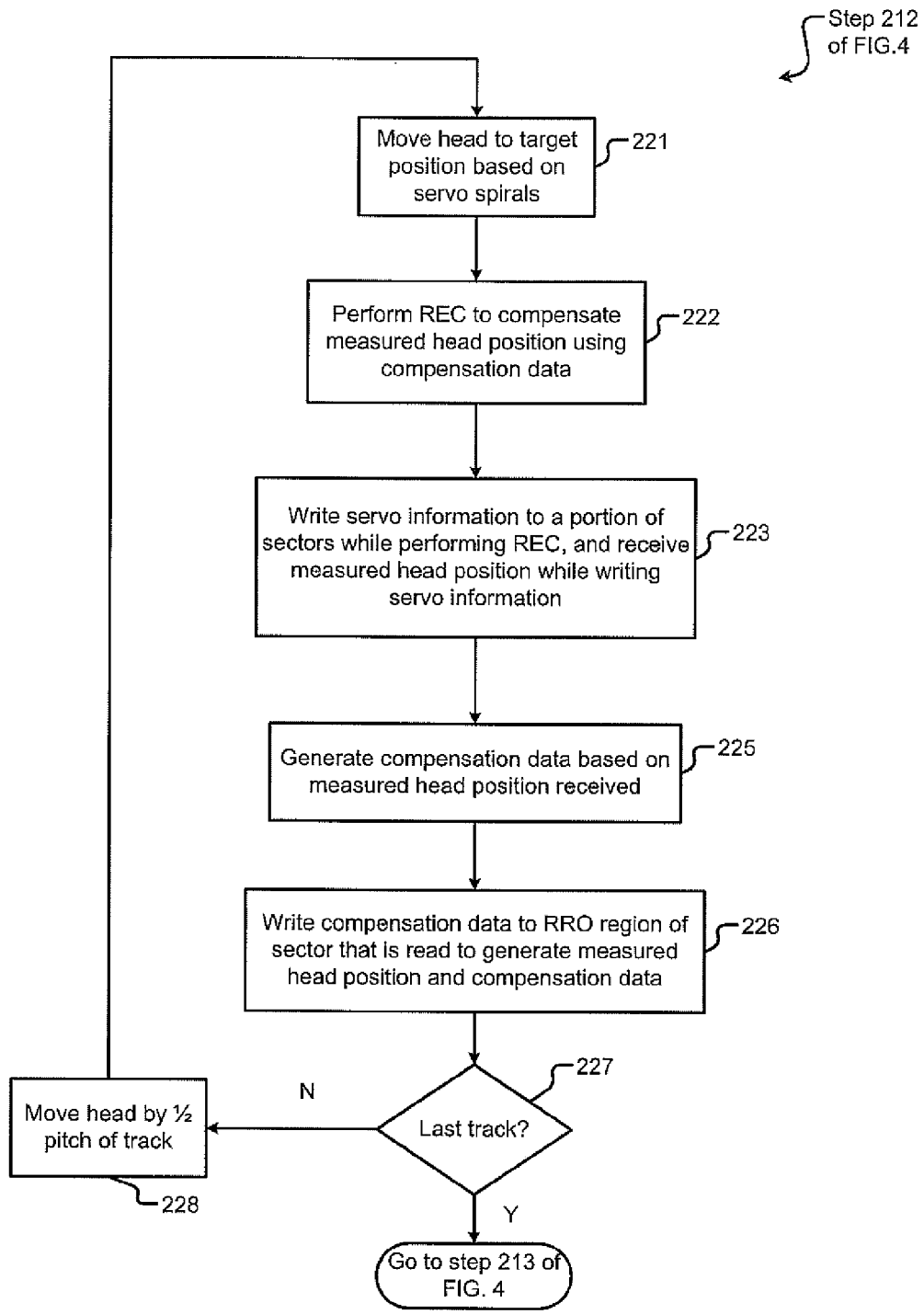
FIG. 6 is a flowchart of a method for writing an initial servo pattern including RRO error compensation data on the HDD using the servo spirals.

Referring now to FIG. 6, step 212 of FIG. 4 is shown in detail. The servo information (i.e., each of the servo wedges) comprises a burst signal positioned over the track center (e.g., burst signals C and D), a burst signal positioned offset from the track center by a ½ pitch (e.g., burst signals A and B), and the compensation data written in RRO regions. As described below, control writes the servo information by repeating steps 221 through 226 and by moving the head in the radial direction by ½ pitch of the track at each repetition.

Initially, in step 221, control moves the head to the radial position to which servo information is to be written. For example, control outputs a target head position and a control instruction to the position control module 124. The position control module 124 moves the head to the target head position based on the already written servo spiral.

In step 222, control executes the REC control for compensating the position control data using the compensation data. The head position measured using the provisional servo information (e.g., servo spiral) is compensated, and the head is stabilized on the track using the compensation data over multiple disk revolutions.

More specifically, control outputs the compensation data to the position control module 124. The position control module 124 compensates the position control data using the compensation data. The servo information writing module 132 adjusts the compensation data over multiple disk revolutions so that the measured head position is stabilized, i.e., the variation of the measured head position synchronized to the speed of the HDD is reduced. Thus, the servo information writing module 132 executes the REC control.

In step 223, control moves the head to the position to which servo information is to be written. Control writes the servo information to a portion of the sectors on the track while executing the REC control. For example, control may write servo information to half of the sectors (e.g., every other sector on the track). Additionally, control receives the measured head position while writing the servo information. Control may receive the measured head position at times corresponding to writing the servo information to each of the sectors.

In step 225, control generates the compensation data based on the measured head position received. For example, control may generate the compensation data for samples corresponding to each of the sectors to which servo information has been written. Control may generate the compensation data according to Equations (1)-(6).

In step 226, control writes the compensation data to the servo region of the sector by reading which the measured head position and the compensation data are generated. Control may write the compensation data in the RRO region of the servo region.

In step 227, control determines if the current track is the last track. If the current track is not the last track, control moves the head by ½ pitch of the track in step 228 and repeats steps 221 through 226. If the current track is the last track, step 212 of FIG. 4 is complete, and control returns to step 213 of FIG. 4. Thus, control writes the compensation data using which the head position can be controlled accurately.

Figure 7:
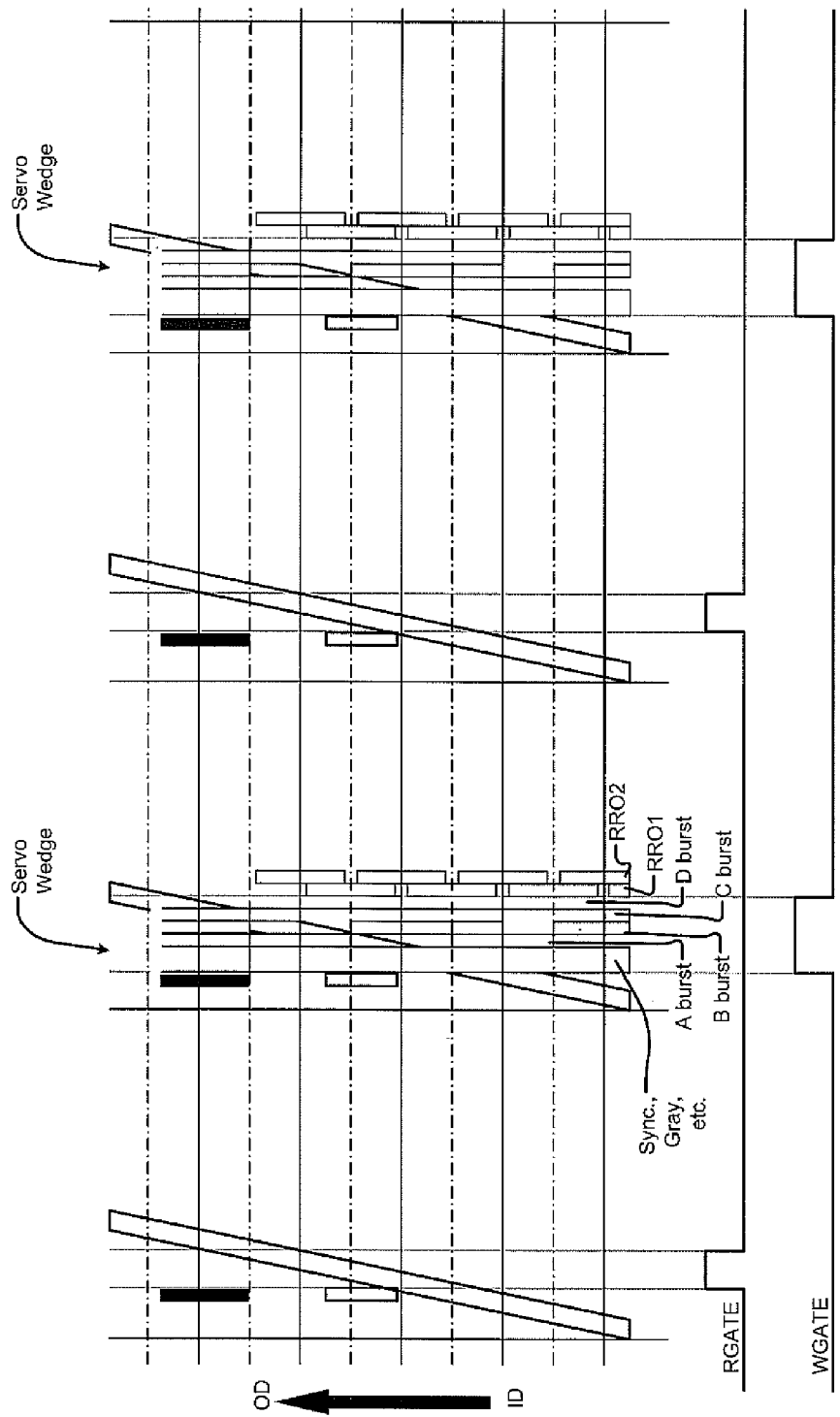
FIG. 7 is a schematic of the initial servo pattern written on the HDD.

Referring now to FIG. 7, an example of the servo information written in step 223 of FIG. 6 is shown. Control may write the servo information sequentially from the inner diameter (ID) to the outer diameter (OD) of the HDD. In step 223, control may write the servo information that includes a synchronization signal, a servo mark, a track number, a sector number, and burst signals A, B, C, and D to the servo region of a sector. Control may write the servo information based on a "WGATE" signal. The "WGATE" signal may be generated based on a "RGATE" signal. The "RGATE" signal may be generated based on the servo spiral written in the sector immediately preceding the sector to which the servo information is to be written.

Figure 8:
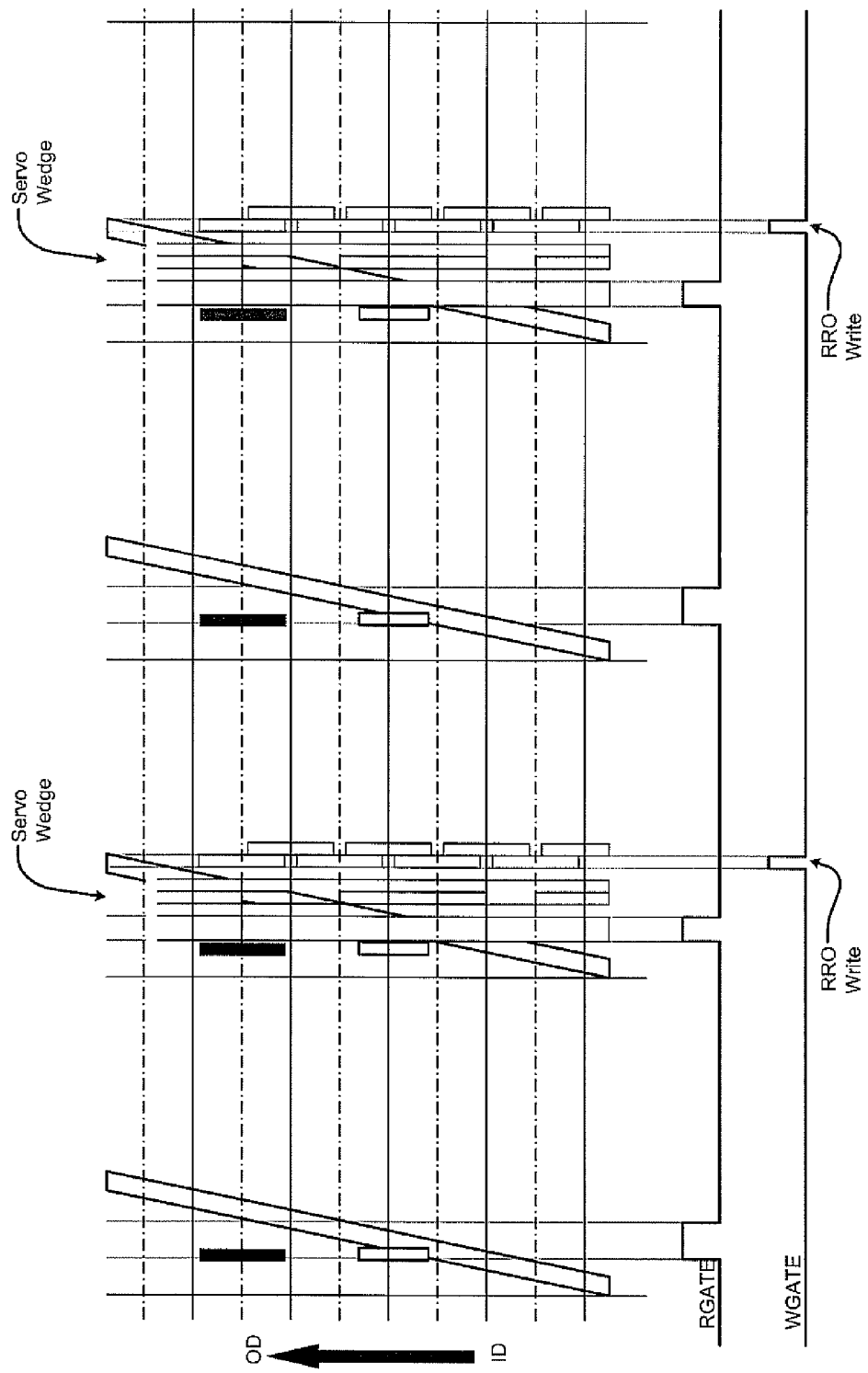
FIG. 8 is a schematic showing the RRO error compensation data written on the HDD.

Referring now to FIG. 8, an example of the compensation data written in step 226 of FIG. 6 is shown. Control may write the servo information based on the "WGATE" signal. The "WGATE" signal may be generated based on the "RGATE" signal. The "RGATE" signal may be generated based on the servo spiral written in the sector immediately preceding the sector to which the compensation data is to be written.

In step 226, control may write the compensation data to the RRO region of the servo region of the sector. The compensation data is written in a different RRO region when writing servo information positioned over the track center (e.g., burst signals C and D) than when writing servo information positioned offset from the track center by a ½ pitch (e.g., burst signals A and B). The compensation data generated based on the head position measured when writing the burst signals A and B is written to a RRO1 region. The compensation data generated based on the head position measured when writing the burst signals C and D is written to a RRO2 region. Thus, control writes a plurality of non-overlapping compensation data when the servo information is written offset by ½ pitch.

Figure 9:
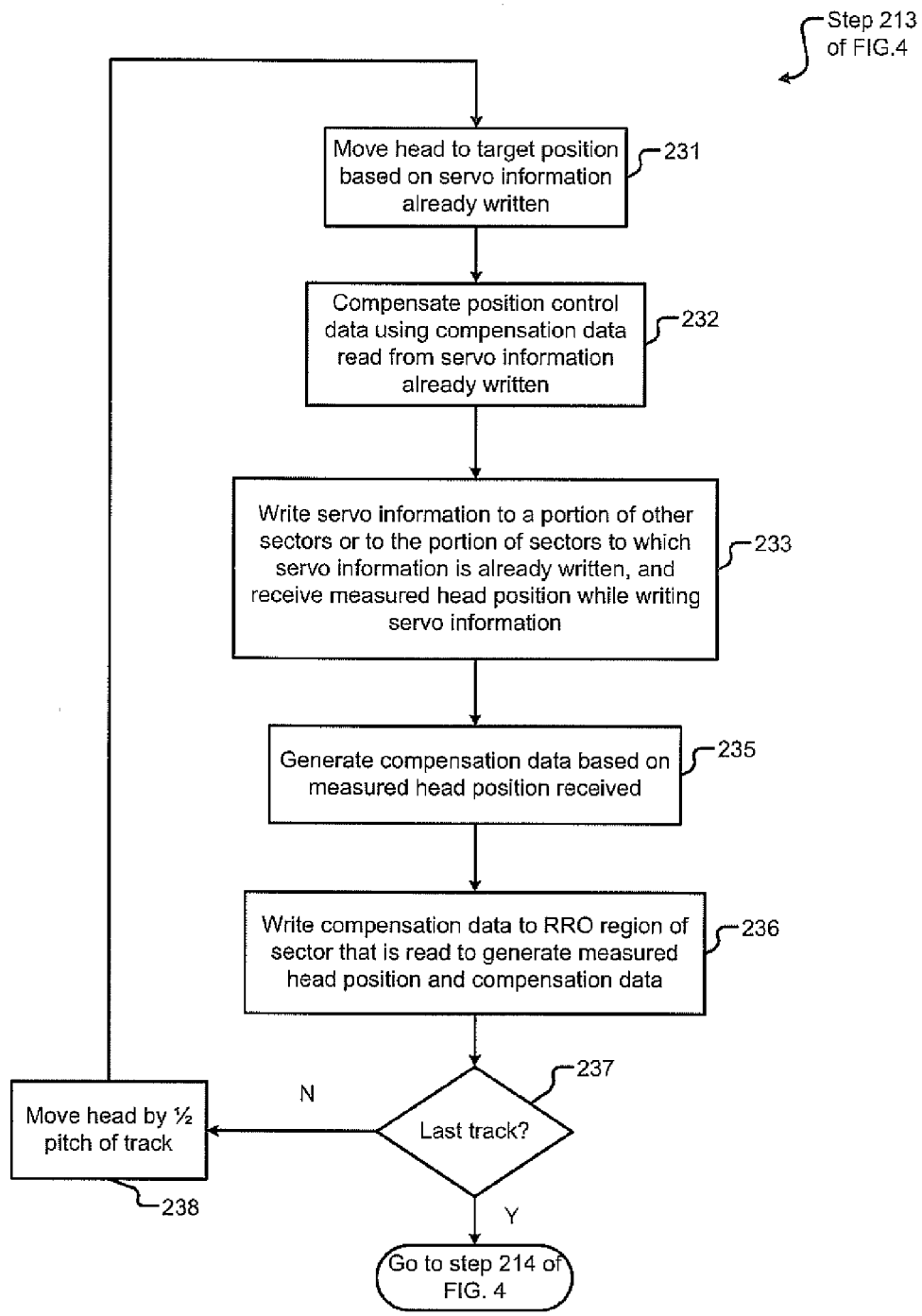
FIG. 9 is a flowchart of a method for writing a final servo pattern including RRO error compensation data on the HDD using the initial servo pattern on the HDD.

Referring now to FIG. 9, step 213 of FIG. 4 is shown in detail. As described below, control writes a final servo pattern (i.e., the second set of servo wedges comprising the compensation data) by repeating steps 231 through 236 and by moving the head in the radial direction by ½ pitch of the track at each repetition.

Initially, in step 231, control moves the head to the radial position to which servo information is to be written. Control may output a target head position and a control instruction to the position control module 124. The position control module 124 moves the head to the target head position based on at least a portion of the servo information already written on the track in step 212.

In step 232, control compensates the position control data using the compensation data. Control reads the compensation data from the servo region of the portion of the sectors on the track to which the servo information (i.e., the first set of servo wedges) has already been written. Thus, the head position is accurately controlled although the written servo information may contain an error.

In step 233, control moves the head to the position to which servo information is to be written. While compensating the position control data using the compensation data, control writes new servo information (i.e., the second set of servo wedges) to the portion of the other sectors or to the portion of the sectors to which servo information has already been written.

For example, control may write new servo information to the portion of the sectors or to each of the sectors to which servo information has not yet been written. Alternatively, control may write new servo information to the portion of the sectors or to each of the sectors to which servo information has not yet been written, and to the portion of the sectors or to each of the sectors to which servo information has already been written. Control may also write new servo information to every sector.

When writing new servo information to a sector to which servo information has been written, control may write new servo information having a servo mark with a different pattern than that of the already written servo information. Accordingly, two or more servo information written into one sector can be distinguished. Control may write new servo information to the remaining sectors using the servo information that has been written to the sectors in step 212 of FIG. 4.

Additionally, control receives the measured head position while writing of servo information in step 233. The measured head position may be received from each of the sectors to which servo information is written in step 233. In step 235, control generates compensation data based on the measured head position received. In step 235, control may perform the operations of step 225 of FIG. 6. In step 236, control writes the compensation data to the servo region. In step 236, control may perform the operations of step 226 of FIG. 6. Additionally, control may use the compensation data generated in step 235 to update the compensation data generated in step 225.

Control may perform steps 235 and 236 if the head is "on-track." In other words, control may perform steps 235 and 236 only to generate the compensation data for aligning the head over the track center. For example, control may perform steps 235 and 236 only to generate the compensation data based on the measured head position when writing the burst signal A or B. This is because the compensation data for aligning the head over the ½ pitch of the track cannot be used while writing and reading data when the head is aligned for each track pitch.

In step 237, control determines if the current track is the last track. If the current track is not the last track, control moves the head by ½ pitch of the track in step 238 and repeats steps 231 through 236. If the current track is the last track, step 213 of FIG. 4 is complete, and control returns to step 214 of FIG. 4.

Thus, when the position control module 124 controls the head position with reference to the written servo information, the position control module 124 can accurately compensate the RRO error component of the measured head position. The RRO error component is synchronized to the speed of the HDD and is typically generated due to the shifting of the written servo information.

In step 232, control may execute the REC control performed in step 222 of FIG. 6 instead of or in addition to compensating the position control data using the compensation data. Control provides, as an initial value for the REC control, the compensation data generated based on the measured head position while writing servo information. Control reads the compensation data from the servo region of the portion of the sectors on the track to which the servo information has already been written and compensates the position control data using the compensation data. Next, control executes the REC control performed in step 222 of FIG. 6.

Thus, control can complete the REC control in a shorter time by shortening the time until the measured head position is stabilized.

Figure 10:
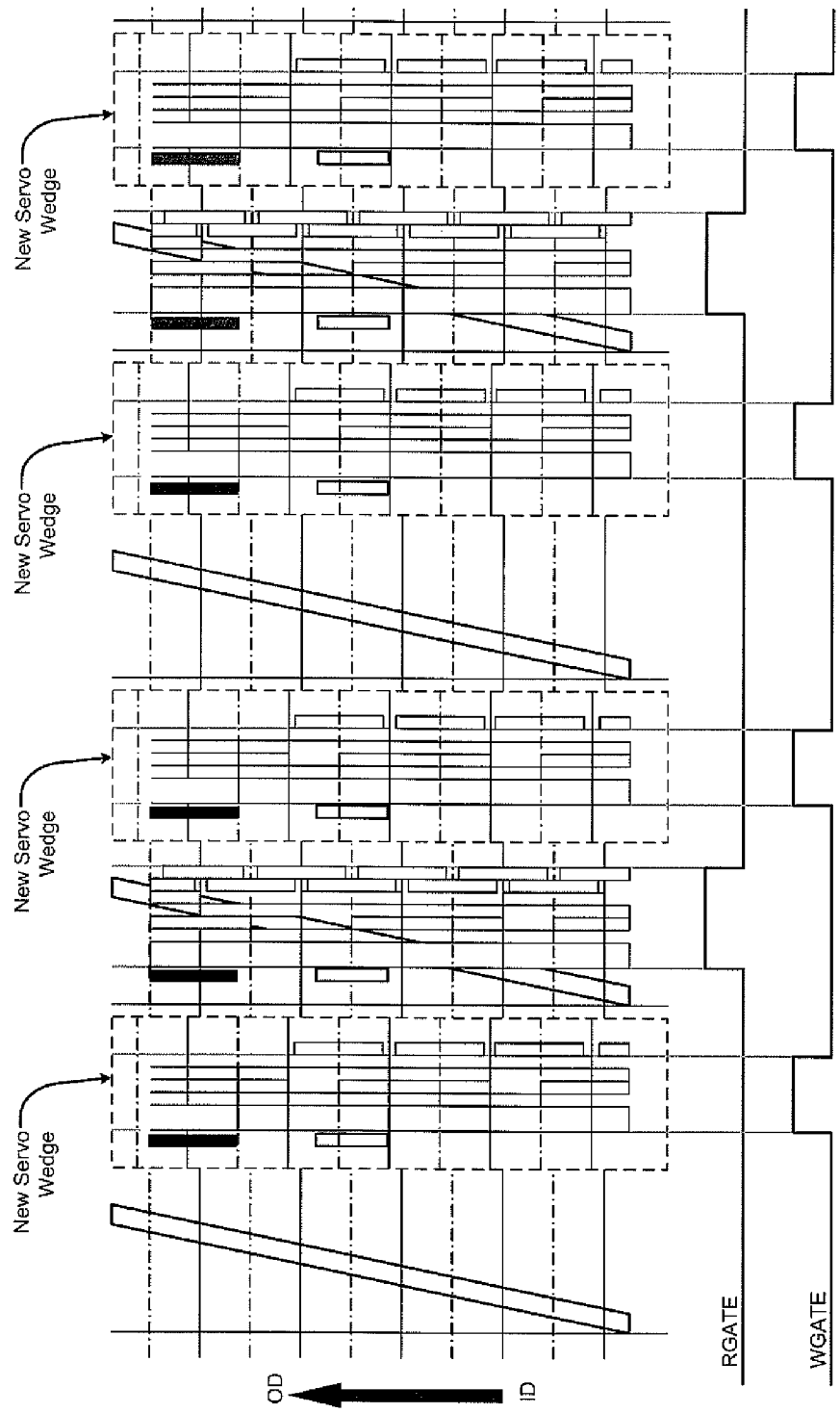
FIG. 10 is a schematic of the final servo pattern written on the HDD.

Referring now to FIG. 10, a portion of a track is shown after servo information is written according to step 233 of FIG. 9. In step 233, control may write, as servo information, a synchronization signal, a servo mark, a track number, a sector number, and burst signals A, B, C, and D to the servo region of a sector. Control may generate the write timing signal for writing servo information (e.g., "WGATE") based on the read timing signal (e.g., "RGATE"). The read timing signal may be generated by reading the servo information written in the sector immediately before the sector to which the servo information is to be written.

Figure 11:
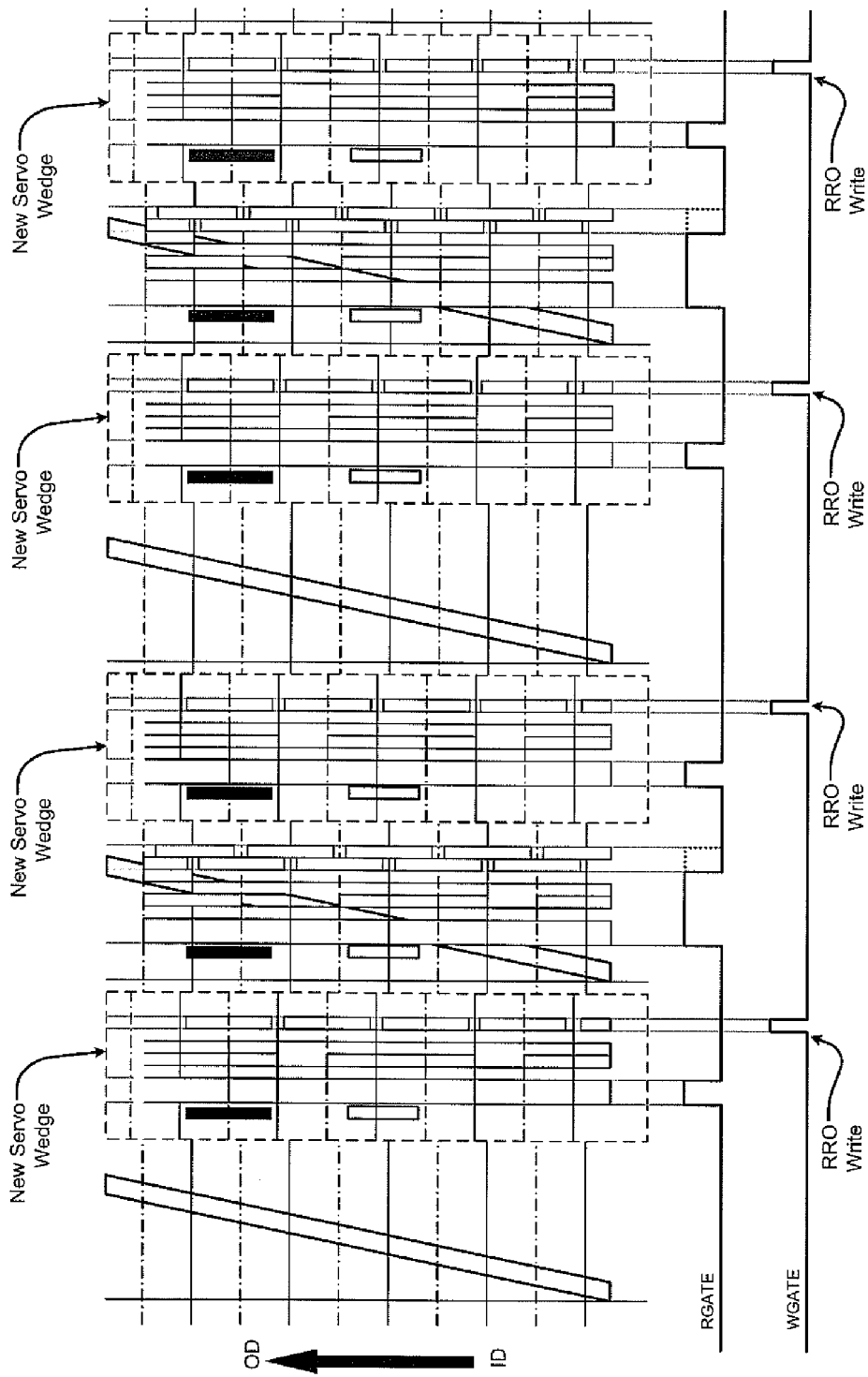
FIG. 11 is a schematic showing the RRO error compensation data written on the HDD.

Referring now to FIG. 11, a portion of a track is shown after compensation data is written according to step 236 of FIG. 9. Control may generate the write timing signal (e.g., "WGATE") for writing the compensation data based on a read timing signal. The read timing signal may be generated by reading the servo information written to the immediately prior sector or based on a synchronization signal (e.g., "RGATE") of the sector to which the compensation data is to be written.

Additionally, in step 236, control may write the compensation data to the RRO region provided in the servo region of the sector. Note that in step 236, control may write only compensation data for aligning the head over the track center. That is, control does not have to write compensation data for aligning the head to a position offset from the track center by a ½ pitch. Control may write the compensation data to the RRO1 region based on the measured head position while writing the burst signal A or B and not based on the measured head position while writing the burst signal C or D.

Figure 12:
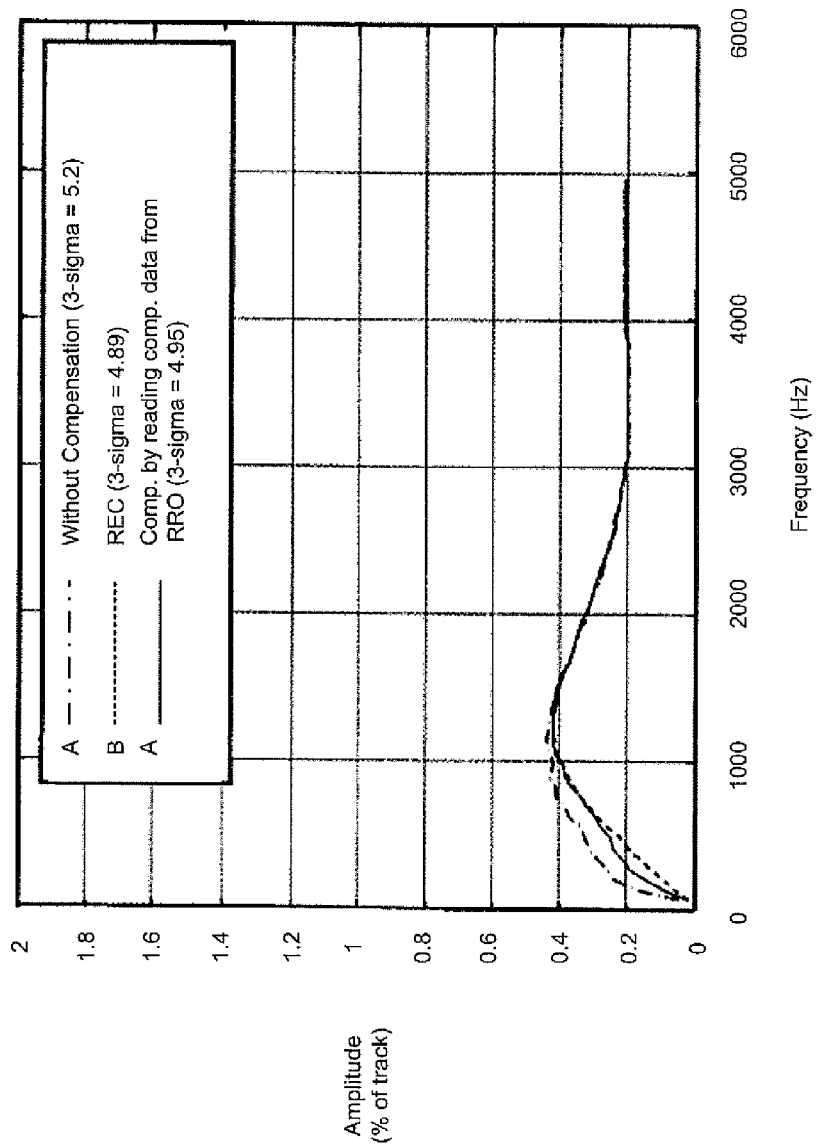
FIGS. 12-20 are graphs depicting exemplary performance data of the system of FIG. 2.

Referring now to FIG. 12, a frequency characteristic (i.e., a spectrum) of a synchronization component of "pes" is shown when accessing any track after the servo information is written. For example, the drawing shows a characteristic of averaging the spectrum of the synchronization component of 200 tracks. "A" denotes "pes" when compensation is not performed in step 232 of FIG. 9. "B" shows "pes" when repetitive error adjustment control is performed in step 232 of FIG. 9. "C" shows "pes" when compensation of the position control data is performed using the compensation data in step 232 of FIG. 9.

As shown in "A," "pes" has the largest amplitude when no compensation is performed. When no compensation is performed, the 3-sigma (3σ) range of "pes" will be 5.2 track pitches. As shown in "B," "pes" has the smallest amplitude when the REC control is performed. When the REC control is performed, the 3-sigma (3σ) range of "pes" will be 4.89 track pitches. As shown in "C," "pes" has a smaller amplitude when the position control data is compensated using the compensation data than when no compensation is performed. When the position control data is compensated using the compensation data, the 3-sigma (3σ) range of "pes" will be 4.95 track pitches. Thus, when the position control data is compensated using the compensation data, more stabilization is achieved than when no compensation is performed.

Figure 14:
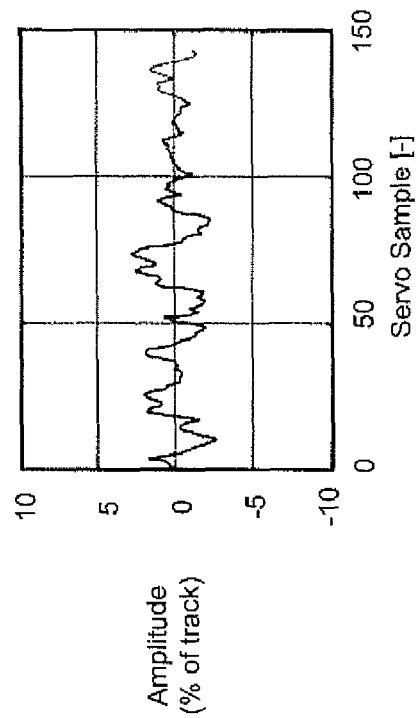
Figure 13:
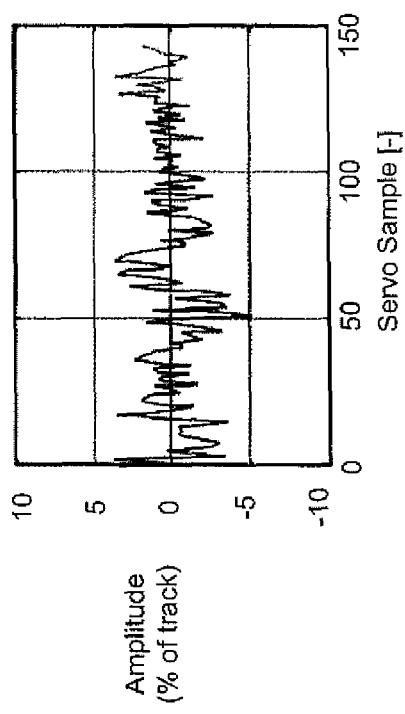
Figure 16:
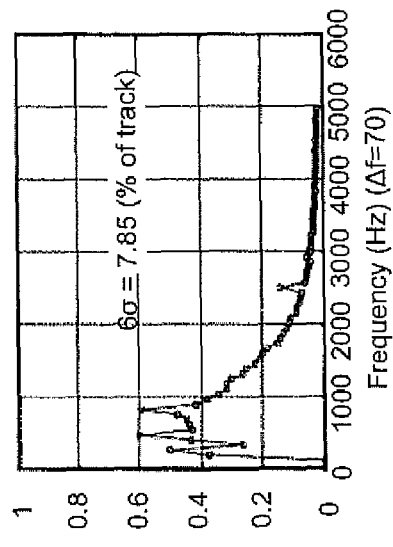
Figure 15:
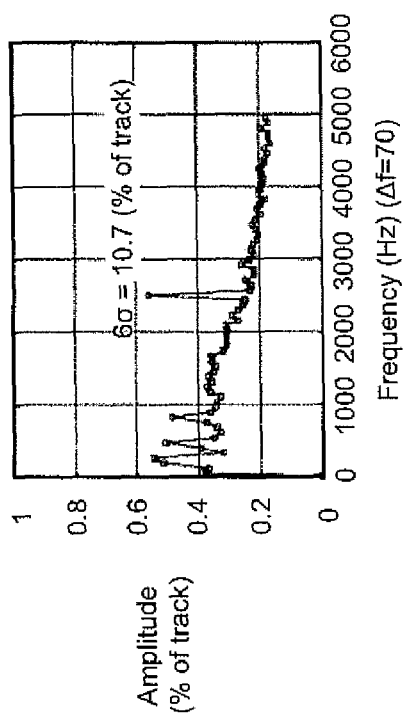

Referring now to FIGS. 13-16, head position measured while writing of servo information and compensation data generated based on the measured head position are shown. FIG. 13 shows a graph of the measured head position in time domain. FIG. 14 shows a graph, in time domain, of data obtained by multiplying the compensation data by the servo-system characteristic S. FIG. 15 shows a graph of the measured head position in frequency domain. FIG. 16 shows a graph, in frequency domain, of the data obtained by multiplying the compensation data by the servo-system characteristic S. FIGS. 15 and 16 show a characteristic of averaging the spectrum of 100 tracks.

Figure 18:
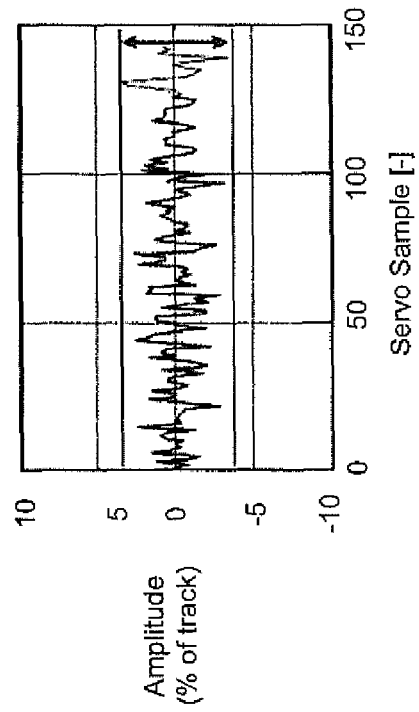
Figure 17:
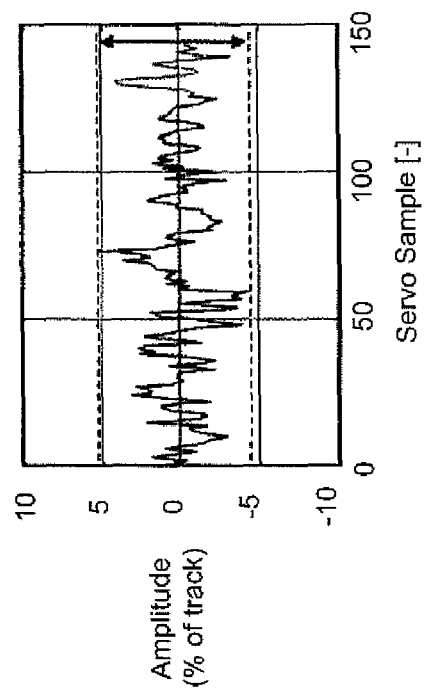
Figure 20:
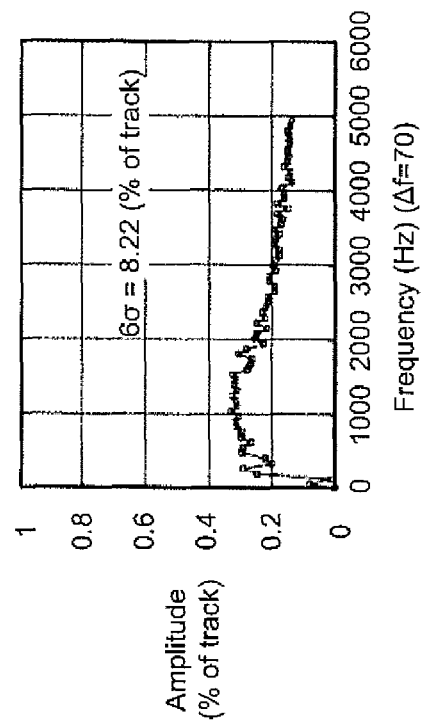
Figure 19:
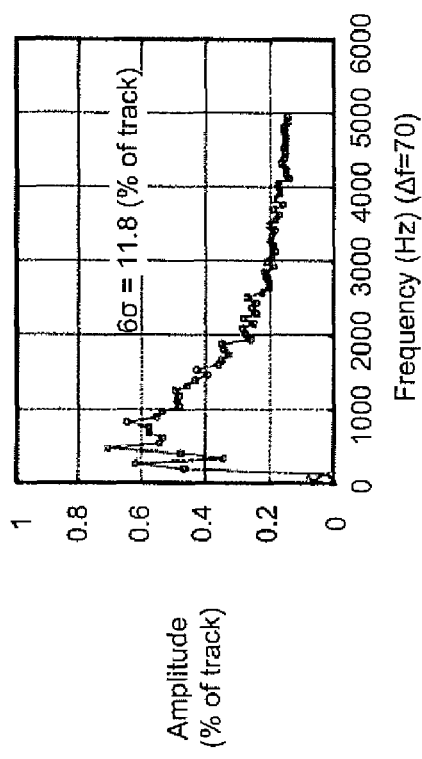

Referring now to FIGS. 17-20, results of accessing tracks after writing the servo information are shown. FIG. 17 shows a graph, in time domain, of the synchronization component of "pes" at the time of aligning a head without using the compensation data generated in step 235 of FIG. 9. FIG. 18 shows a graph, in time domain, of the synchronization component of "pes" at the time of aligning the head using the compensation data generated in step 235 of FIG. 9. FIG. 19 shows a graph, in frequency domain, of the synchronization component of "pes" at the time of aligning the head without using the compensation data generated in step 235 of FIG. 9. FIG. 20 shows a graph, in frequency domain, of the synchronization component of "pes" at the time of aligning the head using the compensation data generated in step 235 of FIG. 9. FIGS. 19 and 20 show a characteristic of averaging the spectrum of 100 tracks.

As can be seen from FIGS. 13-20, the synchronization component of "pes" has a smaller low frequency component and smaller amplitude when the head is aligned using the compensation data than when the head is aligned without using the compensation data. The 6-sigma range of the synchronization component of "pes" is 11.8%/track pitch when aligning the head without using the compensation data and 8.22%/track pitch when aligning the head using the compensation data. Thus, the synchronization component of "pes" when aligning the head using the compensation data is more accurate than when aligning the head without using the compensation data.

In sum, RRO errors are compensated during SSW as follows. Servo spirals are initially written on the HDD. For example, 144 servo spirals may be initially written. Subsequently, a first portion of servo is written by reading the servo spirals. For example, 72 servo wedges may be written based on the 144 servo spirals. Thereafter, a second portion of servo is written. For example, 144 servo wedges may be written based on the 72 servo wedges initially written. While writing the second portion, the head position is controlled by reading the first portion.

While writing the servo (the first and second portions), the head position is controlled by generating position control data. Actual head position is estimated using detected (i.e., measured) head position. Compensation data for compensating the position control data is generated based on the estimated actual head position. REC may also be used to further improve or refine the compensation data. The compensation data is written in RRO fields while writing servo. The compensation data written in the first portion is used to accurately position the head when writing the second portion. The compensation data generated while writing the second portion may also be used to update the compensation data written in the first portion.

During normal operation (e.g., normal read/write operation), the position control data is generated using the servo (i.e., the final servo pattern). Additionally, the position control data is compensated using the compensation data written in the RRO fields in the final servo pattern.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a self-servo-write module configured to position a head of a hard disk drive to write a first set of servo wedges on a magnetic medium of the hard disk drive;
a position measuring module configured to measure a first position of the head when the head writes the first set of servo wedges on the magnetic medium; and
a compensation module configured to generate first data to compensate a repeatable error based on the first position of the head measured by the position measuring module,
wherein the first data to compensate the repeatable error is written on the magnetic medium along with the first set of servo wedges.

2. The system of claim 1, wherein:
the compensation module is configured to generate second data to compensate the repeatable error based on (i) the first set of servo wedges and (ii) the first data read from the magnetic medium while writing a second set of servo wedges on the magnetic medium; and
the self-servo-write module is configured to write the second data on the magnetic medium along with the second set of servo wedges.

3. The system of claim 2, wherein the self-servo-write module is configured to update the first data while writing the second data.

4. The system of claim 2, wherein the self-servo-write module is configured to adjust at least one of the first data and the second data over a plurality of rotations of the magnetic medium.

5. The system of claim 2, wherein:
the position measuring module is configured to measure a second position of the head based on the first set of servo wedges when the head writes the second set of servo wedges on the magnetic medium; and
the compensation module is configured to generate the second data based on the second position when the head writes the second set of servo wedges on the magnetic medium.

6. The system of claim 5, wherein:
the compensation module is configured to generate an estimated position of the head based on the second position of the head using a filter;
the filter is configured to minimize a difference between an actual position of the head and the estimated position of the head; and
the compensation module is configured to generate the second data based on the estimated position of the head.

7. The system of claim 2, further comprising a position control module configured to:
generate third data to control positioning of the head when the head writes the second set of servo wedges on the magnetic medium, and
compensate the third data using the first data read from the magnetic medium when the head writes the second set of servo wedges on the magnetic medium.

8. The system of claim 2, further comprising a position control module configured to:
generate third data to control positioning of the head, and
compensate the third data using the second data read from the magnetic medium.

9. The system of claim 1, wherein:
the position measuring module is configured to measure the first position of the head based on servo spirals written on the magnetic medium, wherein the servo spirals are written on the magnetic medium before the first set of servo wedges is written on the magnetic medium.

10. The system of claim 1, wherein:
the compensation module is configured to generate an estimated position of the head based on the first position of the head using a filter;
the filter is configured to minimize a difference between an actual position of the head and the estimated position of the head; and
the compensation module is configured to generate the first data based on the estimated position of the head.

11. A method comprising:
measuring a first position of a head of a hard disk drive when the head writes a first set of servo wedges on a magnetic medium of the hard disk drive;
generating first data to compensate a repeatable error based on the first position of the head; and
writing the first data on the magnetic medium along with the first set of servo wedges.

12. The method of claim 11, further comprising:
generating second data to compensate the repeatable error based on (i) the first set of servo wedges and (ii) the first data read from the magnetic medium while writing a second set of servo wedges on the magnetic medium; and
writing the second data on the magnetic medium along with the second set of servo wedges.

13. The method of claim 12, further comprising updating the first data while writing the second data.

14. The method of claim 12, further comprising adjusting at least one of the first data and the second data over a plurality of rotations of the magnetic medium.

15. The method of claim 12, further comprising:
measuring a second position of the head based on the first set of servo wedges when the head writes the second set of servo wedges on the magnetic medium; and
generating the second data based on the second position when the head writes the second set of servo wedges on the magnetic medium.

16. The method of claim 15, further comprising:
generating an estimated position of the head based on the second position of the head using a filter configured to minimize a difference between an actual position of the head and the estimated position of the head; and
generating the second data based on the estimated position of the head.

17. The method of claim 12, further comprising:
generating third data to control positioning of the head when the head writes the second set of servo wedges on the magnetic medium; and
compensating the third data using the first data read from the magnetic medium when the head writes the second set of servo wedges on the magnetic medium.

18. The method of claim 12, further comprising:
generating third data to control positioning of the head, and
compensating the third data using the second data read from the magnetic medium.

19. The method of claim 11, further comprising:
measuring the first position of the head based on servo spirals written on the magnetic medium,
wherein the servo spirals are written on the magnetic medium before the first set of servo wedges is written on the magnetic medium.

20. The method of claim 11, further comprising:
generating an estimated position of the head based on the first position of the head using a filter configured to minimize a difference between an actual position of the head and the estimated position of the head; and
generating the first data based on the estimated position of the head.

* * * * *